United States Patent [19]

Weckenmann et al.

[11] 4,160,238

[45] Jul. 3, 1979

[54] REMOTE CONTROL ADDRESSING AND REPLY INDICATING SYSTEM

[75] Inventors: Albert Weckenmann, Ahrensburg; Jürgen Wesemeyer, Nüremberg; Georg Haubner, Berg; Werner Meier, Schwabach; Hartmut Zöbl, Fürth, all of Fed. Rep. of Germany

[73] Assignee: Robert Bosch GmbH, Stuttgart, Fed. Rep. of Germany

[21] Appl. No.: 836,979

[22] Filed: Sep. 26, 1977

[30] Foreign Application Priority Data

Sep. 30, 1976 [DE]  Fed. Rep. of Germany ....... 2644106

[51] Int. Cl.$^2$ ............................................. H04Q 11/04
[52] U.S. Cl. ............................ 340/147 R; 340/168 R; 340/147 SY; 340/163
[58] Field of Search ............... 340/147 C, 163, 168 R, 340/167 R, 147 SY, 147 R

[56] References Cited

U.S. PATENT DOCUMENTS

| 3,804,986 | 4/1974 | Wakamatsu | 179/15 A |
|---|---|---|---|
| 4,085,403 | 4/1978 | Meier | 340/163 |

FOREIGN PATENT DOCUMENTS

| 2135950 | 12/1972 | France | 340/147 R |
|---|---|---|---|
| 886663 | 1/1962 | United Kingdom | 340/147 R |
| 1149752 | 4/1969 | United Kingdom | 340/147 R |
| 1427133 | 2/1973 | United Kingdom | 340/147 R |

Primary Examiner—Harold I. Pitts
Attorney, Agent, or Firm—Frishauf, Holtz, Goodman & Woodward

[57] ABSTRACT

A plurality of receivers which can be respectively addressed by addressing pulses provide reply pulses on a separate reply signal bus indicative of a single digit, or multi-digit binary response condition. To permit extended indication, the central station includes a holding stage which holds the output received from the reply receivers for the duration of a selection cycle during which the plurality of loads can be addressed, for example during a predetermined counted number of such cycles or during a predetermined counted number of pulses to permit averaging-type instruments to respond to said number of pulses —if present—or to permit extended indication of single digit binary output—if present.

36 Claims, 7 Drawing Figures

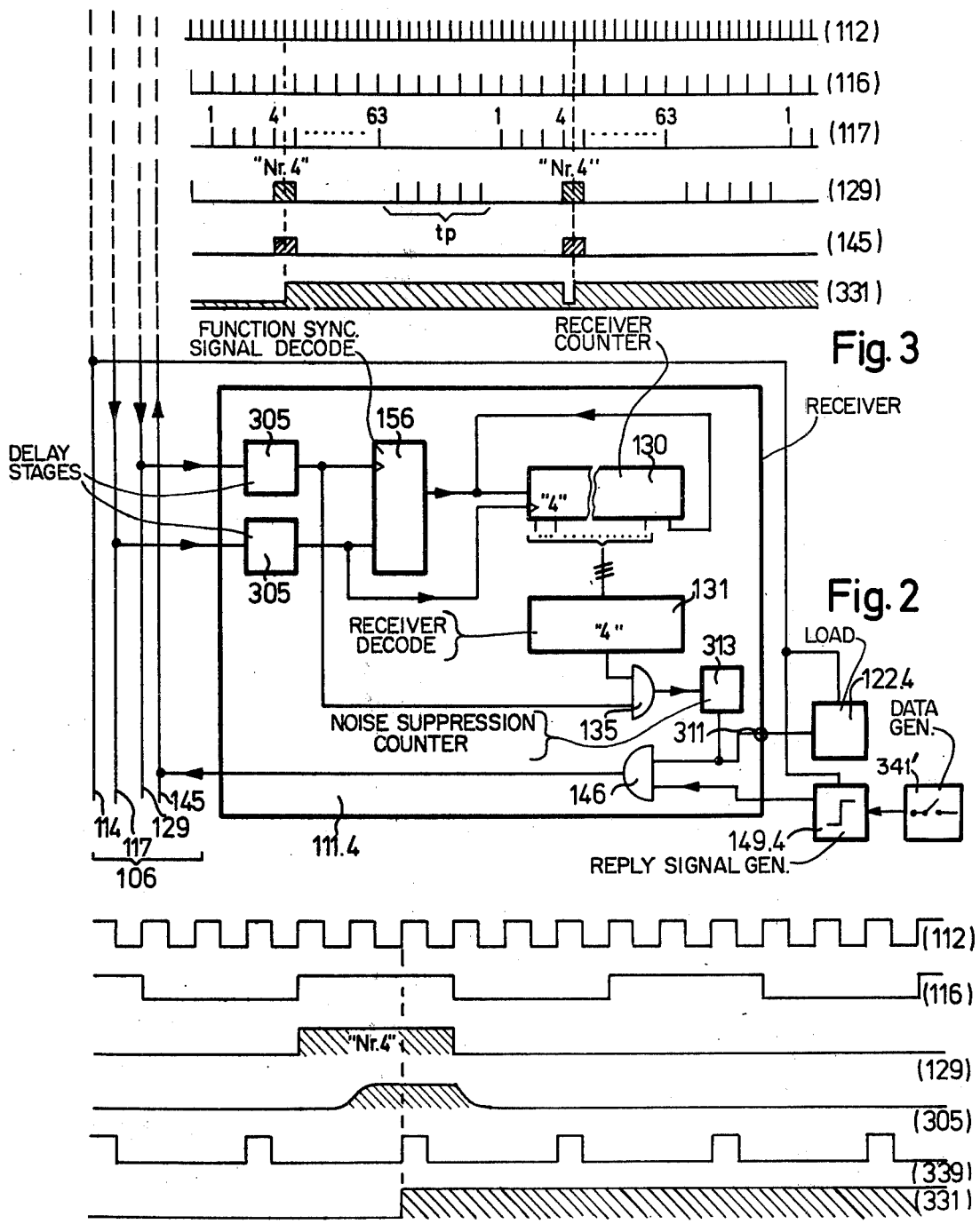

REMOTE CONTROL ADDRESSING AND REPLY INDICATING SYSTEM

REFERENCE TO RELATED APPLICATIONS

U.S. Ser. No. 648,783, filed Jan. 13, 1976, Meier et al., now U.S. Pat. No. 4,085,403.

U.S. application Ser. No. 835,180, filed Sept. 20, 1977.
U.S. application Ser. No. 840,487, filed Oct. 7, 1977.

The present invention relates to a remote control system for selection of at least one of a plurality of selectively switchable loads from a central station and more particularly to such systems to control response of measuring instruments in automotive vehicles in which the measuring instruments provide outputs which are not necessarily of a single digit binary (ON-OFF) characteristic, but provide outputs indicative of a continuous variable.

BACKGROUND AND PRIOR ART

It has previously been proposed—see German disclosure document DT-OS No. 25 03 679, to which U.S. patent application Ser. No. 648,783, filed Jan. 13, 1976, Meier et al, now U.S. Pat. No. 4,085,403, and assigned to the assignee of the present application corresponds, to provide a remote control system in which a central station is connected to a ring bus having a power line or bus, a clock line, or bus, a control line, or bus, and a reply line or bus. To avoid needless repetition, the disclosure of the aforementioned published German disclosure document, and of the corresponding U.S. patent application is hereby incorporated by reference. Briefly, the system of that application uses a central station to send out pulses during a period of time forming a selection cycle on the clockline; synchronously therewith, pulses are sent out on the command bus which pulses on the command bus and on the clock bus are decoded by the respective receivers. Upon synchronism of a pulse on the command line and on the clock line, and decoded by a specific receiver responsive to such synchronism, a load is commanded to carry out a switching function by the specific receiver. Synchronously with the carrying out of the commanded switching function, an acknowledgement signal is generated and applied to the reply bus so that, in the receiver, all within the period of one clock pulse, a selection is effected and, simultaneously, an acknowledgement is received which can be indicated showing that the commanded switching function has been carried out.

The selection cycles are separated from each other by control signals which, preferably, appear on the clock line and may be formed by a timing interval, that is, a pause in pulses on the clock line or, as described in cross referenced application Ser. No. 835,180, filed Sept. 20, 1977, Weckenmann and Haubner may be formed by a pulse train of a predetermined number of pulses on the control bus.

Remote control systems of this kind have been found to work very well in pilot installations so that practical application of such systems, particularly to command switching functions in components of automotive vehicles can be realized the reby.

SUMMARY OF THE INVENTION

It is an object of the present invention improve the reliability of such systems so that vehicle operating safety is enhanced; to permit, as far as possible, use of digital circuitry for the functional elements and, specifically, for the reply or acknowledgement transmission functions; and to permit use of indicating instruments now customary in automotive vehicles in conjunction with the system.

Briefly, the present invention is specifically directed to the reply, or acknowledgement function of the remote control system. The reply signal generator means in at least one of respective receivers comprises a data generating stage; and, in the central station, the reply decoding stage comprises a data receiver, connected to the reply bus and to the clock bus and includes a holding circuit to hold information transmitted to the reply receiving stage for a period of time extending substantially longer than the one pulse during which the specific receiver was selected and the reply received, and preferably to hold the response data for about the duration of a selection cycle, or in dependence on the continuation of the selection cycle. The holding circuit may, for example, include a bistable flip flop or the like.

As a result of a system, the reply data received from a specific receiver back at the central station can be transformed into a pulse having a predetermined length with respect to the selection cycle. Such an extended, transformed reply signal can be used directly to control measuring instruments which form averages. An additional advantage is obtained in that possible variations in the length of the respective selection cycles will be without influence on the indication of a measuring instrument without requiring additional control, or superposed corrections in the evaluation circuit included within the reply indicator as such.

This system then permits to use a standard component within the reply indicator to evaluate and indicate the information being sent back over the reply bus, independently of the type of reply, or reply transducer which is used. Thus, the reply transducer may supply its information in the form of a single digit binary output, for example OFF-ON, or it may be a transducer which provides pulses which are representative of quantitized measured values which have a multi-digit information content and include a multi-digit information transducer.

BRIEF DESCRIPTION OF THE DRAWINGS

FIG. 2 is schematic diagram of the receiver for the fourth load;

FIG. 3 shows timing diagrams arising at various buses, and components at the central station of the system;

FIG. 4 is a series of timing diagrams shown to an expanded time scale and illustrating a time window of the pulses shown in FIG. 3 to illustrate the relative coordination of the pulses;

DESCRIPTION OF THE PREFERRED EMBODIMENT

Figure 1:
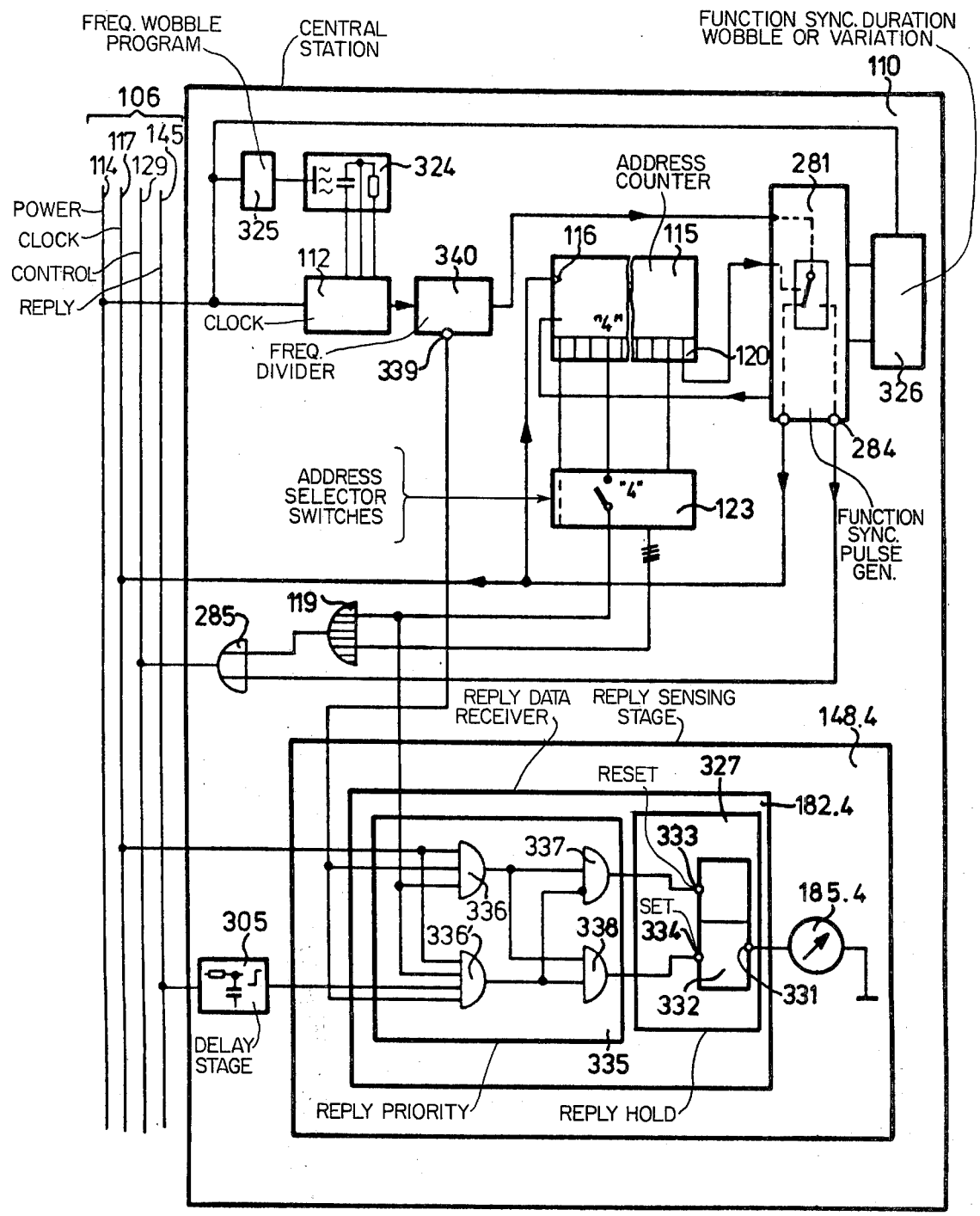
FIG. 1 is a schematic diagram of a central station connected to a ring bus system, and in which, as shown, the load which is assigned number 4 has been selected to respond within a selection cycle.

The disclosure of U.S. Pat. No. 4,085,403 has been followed insofar as possible in the designation of reference numeral and of components. Thus, the bus system 106 having a power bus 114, a clock bus 117, a control bus 129 and a reply bus 145 is similar to that of the aforementioned U.S. patent. For a detailed description, reference is made to the aforementioned U.S. Pat. No. 4,085,403.

Briefly, the central station 110 and shown only in the simplified form in FIG. 1 herein has a clock generator 112 which is connected to a function synchronization pulse generator 281. The function synchronization pulse generator forms a transfer switch to direct the clock pulses from clock 112 either to the count input 116 of an address counter 115 or to provide function synchronization pulses from the output 284 to the control bus 129 from the function synchronization pulse generator. The details of the function synchronization pulse generator are described in U.S. application Ser. No. 835,180, filed Sept. 20, 1977, Weckenmann and Haubner. The output signal from clock 112 is illustrated in the top line of FIG. 3, and also in the top line of FIG. 4. FIG. 3 and 4, at the right side, are labeled with the respective elements where the pulses shown thereon appear. The illustration of the pulses in FIG. 3 of the clock 112, in the form of needle pulses is simplified to facilitate understanding. In actual practice, a ON/OFF ratio for pulses and pulse pauses of 1:1 is preferred, as illustrated in FIG. 4.

The count pulses of a count input 116 of counter 115 are applied to the clock bus 117 of the ring bus system 106. The function synchronization pulse generator 281 responds when counter 115 has reached its highest count state. For a certain period of time, no further clock pulses are applied as counter pulses to the count input 116 of the address counter 115. Rather, the next subsequent pulses are applied as function synchronization pulses from the output 284 of the function synchronization pulse generator 281 to the control bus 129 of the ring bus system 106. The pulses at terminal 284 are shown in FIG. 3 as the pulses tp. During occurrence of these pulses, there will be a pause, or an absence of pulses on the clock 117. Thus, the function sync pulses 117 thus occur in the period of time when there are no clock pulses at the count input 116 of the address counter; rather, during that period the function sync pulses are directed by the transfer switch function of the function sync pulse generator 281 to its sync pulse output 284. The sync pulses at terminal 284, coupled with a pause of pulses on the clock line form a control signal which separates succeeding counts of the address counter 115. Thus, the duration of the count of a counter 115 is referred to as a selection cycle, or count cycle of the address counter 115, separated by a control signal. The third line of FIG. 3 only shows the clock pulses 1 to 63 of two succeeding selection cycles, and the beginning of the third selection cycle. During the pause of pulses on the clock bus 117, the function sync pulses appear on the control bus 129, as shown at tp on line 4 of FIG. 3.

To select a specific load, an addressing switching system is provided, formed by selectively switchable addressing switches 123. If the fourth switch of the addressing switch 123 is closed during the course of counting by the address counter 115 of a selection cycle, the pulse illustrated in the fourth line of FIG. 3 as "Nr. 4" is transmitted during the counting of the address counter 115 over OR gate 119 and a further OR gate 285 to the control bus 129 of the ring bus system 106. Thus, a receiver can decode synchronism of a clock pulse on clock bus 117 and, if set to recognize the fourth one, the occurrence of a synchronous control selection pulse on control bus 129.

The receiver can thus recognize three modes: pulses occurring only on the clock bus 117, during which time all receivers will count synchronously; simultaneous occurrence of a clock pulse on bus 117 and on the control bus 129, indicative of selection of the specific receiver to which the count number of the synchronous occurrence of the counted clock pulse is assigned; and occurrence only of a pulse train on control bus 129, with no pulses on the clock bus 117, which form the control signal providing for function synchronization.

Each receiver 111 (FIG. 2) connected to the ring bus system 106 has a receiver counter 130 which corresponds to the address counter 115 in the central station 110. At the beginning of any selection cycle, the receiver counter 130 is set to its count start state by a control signal sensing circuit 156 which decodes the function synchronization signal. When the function synchronization signal has terminated, the respective receiver counters 130 in the receivers count synchronously with the pulses occurring on the clock bus 117, as transmitted from the address counter 115 in the central station. If the fourth receiver is to be addressed, corresponding to closing of the fourth selection switch 123.4, a pulse will occur on the control bus 129 synchronously with the fourth count of the address counter, that is, the fourth pulse within any one of the selection cycles on clock bus 117. At that time, all those receivers 111.4 have been addressed in which a decoding stage 131, connected to the receiver counter 130 (FIG. 2) is connected to recognize the fourth count state of the receiver counter 130. Upon such recognition, the AND gate 135, connected to the output from the receiver counter and to the control bus 129 will be enabled to recognize coincidence. Energization of AND gate 135 permits connection of a load 122.4 controlled by the AND gate 135, and connected to the output terminal 311 of the receiver 111.4. At least one noise pulse suppression counter 313 is connected serially between the output of AND gate 135 and the output terminal 311 of the receiver, to insure that the load will not respond to erroneous pulses. Such a noise pulse suppression counter is described in German disclosure document DT-OS No. 26 43 518.

The output of the AND gate 135, through the noise pulse suppression counter 313 is additionally connected one input of an AND gate 146, the other input of which is connected to a reply signal generator 149—for load 122.4, the generator 149.4. The reply signal generator 149, in one form, may be a signal digit binary switch, for example an ON-OFF switch responding to response of the load 122.4. A signal from the reply signal generator 149.4 thus enables AND gate which is previously enabled by the AND gate 135 through the noise suppression counter 313 to provide a reply and acknowledge pulse to the reply bus 145, synchronously with the switching pulse which has selected the specific receiver 111.4 on the control bus 129 (fourth line of FIG. 3) and the respective fourth clock pulse on clock line 117. The synchronous reply pulse on bus 145 is shown on the fifth line of FIG. 3. It is transmitted back to the central station 110. The reply signal generator 149 generates a signal representation of reply data, as provided by a data generator, e.g. an ON-OFF switch 341', closing of relay contacts, temperature change, or the like. The signal generator 149 and the data generator 341' may be merged into a single element.

Upon acknowledgement of the switching function commanded in load 122.4 by the reply signal generator 149, that is, when AND gate 146 is enabled, the central station 110 (FIG. 1) will respond by enabling a receiver reply sensing stage 148.4. Each one of the receivers has a specific reply sensing stage associated therewith; thus, the reply signal generator 149.4 of receiver 111.4 has a reply sensing stage 148.4 associated therewith. The reply sensing stages 148 have visual or audible operator readable indicators 185; thus, reply sensing stage 148.4 includes a measuring instrument 185.4 which indicates the information content transmitted by reply signal generator 149.4.

In accordance with the present invention, at least some of the reply sensing stages 148.4 include a reply holding stage 327, shown in FIG. 1 as a flip flop circuit (FF) 332. The respective measuring instrument 185 is connected to the information output terminal 331 of the FF 332. The reset input 333 is enabled through a logic circuit including AND gate 337 and AND gate 336 from the respective output terminal 120.4 of the address counter 115 through the address selector switching stage 123.4. The SET input 334 of FF 332 is controlled, through AND gates 336' and 338 from the reply signal on reply bus 145. The holding circuit formed by FF 332 is part of a reply data receiver 182 and is used for wave shaping and signal transformation in accordance with the occurrence of reply pulses synchronized with clock pulses and control pulses. To provide for unambiguous control of FF 332, a reply pulse priority logic 335 is provided which includes the AND gates 336, 336' and the AND gates 337, 338. The respective AND gates have the function to allocate the specific reply data receiver 148.4, and the indicator 185.4 to the specific receiver 111.4 selected by the selector switch 123.4. The details of the function of the reply comparison, or reply decoding system is described in German disclosure document DT-OS No. 25 13 327.

Briefly, whenever a switching pulse is commanded by operation of a respective switch 123.4 to be applied to the ring bus system 106, but if there is no coinciding reply pulse, the inhibit gate 337 will be enabled thus controlling the reset input 333 to reset FF 332. If, however, synchronously with the switching pulse, a coordinate reply pulse occurs, the AND condition of the respective input of the inhibit gate 337 is not fulfilled, since the second input thereto is an inverting input as indicated by the connection from AND gate 336', and only AND gate 338 will be enabled. Accordingly, FF 332 will be set over its SET input 334, so that the indicator 185.4 will be commanded to indicate.

An integrator 305 is preferably connected between the reply bus and the reply sensing stage 148 in order to insure unambiguous switching. The integrator 305 permits less accuracy in the selection of components and elements within the reply data receiver 182.4, particularly of FF 332. The integrator thus provides for unambiguous switching condition even if there is strict coincidence between a switching pulse and a reply pulse. Integrator 305 additionally blocks out needle or spike-shaped distrubance noise pulses, as described in the aforementioned German disclosure document DT-OS No. 26 43 518 and in the aforementioned U.S. application Ser. No. 835,180, filed Sept. 20, 1977. This insures that the reply pulse is slightly delayed with respect to the clock pulse 117, forming the switching pulse for the reply data receiver. The slight delay thus provides, within any one selection cycle, reset of the FF 332 upon occurrence of the clock switching pulse on line 117, and immediately thereafter reset of the FF 332 upon coincidence of the reply pulse with the remainder of the clock pulse, forming the switching pulse. Thus, the delay by the time constant of the integrator 305 delays the reply pulse to form a priority in the reply priority stage 335 for first the reset pulse and then the reply pulse. Signals which result at terminal 331 of the reply hold stage 327 are shown in the last line of FIG. 3. During the first selection cycle, reply signal generator 149 has first supplied a pulse on reply bus 145 (fifth line labeled "145" in FIG. 3). Thereafter, reply generator 149 continues to supply reply pulses on bus 145. As a consequence, the output signal from terminal 331 shows a short-time collapse due to the resetting and immediate setting of FF 332, occasioned by the delay effected by the time delay stage 305, in its simplest form command integrator.

The extension of the reply pulse is particularly important if the reply signal generator does not merely provide a simple ON-OFF information, but rather provides decoded information which contains data represented by sequential presence and absence of reply pulses over a predetermined number, or sequence of selection cycles. By extending the reply pulse, a directly indicating instrument which, inherently, shows an average output can be used. Thus, the measuring instrument 185 can then be connected directly to the reply data receiver 182 without an additional storage circuit since sufficient energy is being supplied by extending the pulses to permit an averaging meter to respond in accordance with its characteristics.

The reply priority logic 335 is connected to the clock bus 117 in order to provide synchronization by the clock pulses. This increases the operating reliability of the reply sensing stage 148. To further improve the synchronization of timing and the operating reliability, the AND gates 336, 336' are additionally connected to a steering output 339 of a frequency divider 340 connected to clock 112. The AND gate 336, 336' and the additional connection to the frequency divider 340 are strictly necessary but are preferred to provide for accurate synchronization. The frequency divider 340 divides the output frequency clock 112 to the desired clock frequency which is effective at the input 116 of address counter 115 and, eventually, is applied to clock bus 117. The output 339 is so connected that lead or steering pulse appears thereat between subsequent clock pulses. This lead pulse is thus temporally offset with the control clock and reply pulses which, as discussed above, are synchronized with respect to each other. To simplify the illustration, FIG. 3 shows a frequency division of 1:2 within the frequency divider 340. Consequently, only every other one of the output pulses of the clock 112 (upper line of FIG. 3) will appear as a count pulse at the count input 116 of the address counter 115, as illustrated in the second line of FIG. 3. The lead pulses from terminal 339 of the frequency divider 340, and in accordance with the dimensioning of the division of the frequency divider then open, or enable the input AND gates 336, 336' of the priority 335, so that evaluation of the reply pulses appearing on the reply line 145 can no longer be subject to interference by inaccuracies in synchronization, for example arising due to somewhat overlapping flanks of pulses, arising, for example due to degradation within the circuitry, or wiring of the bus 106, or the connections thereto.

In actual practice, clock pulses having a ON/OFF ratio of 1:1 are preferred, so that the switching or command and the reply pulses essentially have the same lengths as the clock pulses. In spite of the association, with respect to time, the control and reply pulses will appear slightly delayed, entirely independently of the delay stage formed by integrator 305. The leading flanks, particularly, of the return reply pulses arrive with some degradation with respect to a theoretically sharp square wave. In order to insure, however, at least quasi-stationary conditions upon evaluation of the reply data in the reply sensing stage 148, the frequency divider 340 is so selected that its division ratio is at least 1:3, and the respective third pulse will form the lead pulse available at the output terminal 339. This condition is illustrated in FIG. 4. The lead pulse from terminal 339 is seen on the fifth line of FIG. 4 and appears just shortly before a clock pulse terminates (second line of FIG. 4) and thus at a period of time which insures reproducible switching condition to set FF 332 (see FIG. 1; and line 6 in FIG. 4) to operate under essentially static conditions since the distorted reply pulse (line 4 in FIG. 4) has already reached its maximum, so that the distortion of the reply pulse with respect to the leading flank of the clock pulse will not cause difficulties.

In accordance with the invention, the effective length of the reply pulse is extended by the reply holding stage 327 to essentially the length of the selection cycle (FIG. 3). This is a substantial advantage of using a lead pulse from terminal 339 of frequency divider 340 at a defined period of time, with reference to the instantaneous lengths of a clock pulse (compare first and second lines of FIG. 4). These two features, combined, provide the substantial advantage that if the clock pulses should vary in length, for example due to variations in overall supply or operating voltage or the like, and thus result in changes in the length of the selection cycles, the evaluations of measurement are not thereby interfered with. These evaluations are always normalized to the duration of the actual selection cycle. For actual practice, this means that variations in the clock pulse frequency can be accepted or can even be deliberately caused without requiring interference in, or compensation of the actual measured evaluation of the information or data fed back. Thus, no correction factors need be introduced to the indication derived from the instrument 185 in spite of variations of the clock frequency.

For some purposes it may be desirable to deliberately vary the pulse frequency to prevent introduction of periodic interference into the ring bus system 106. Such periodic interference may be coupled in, for example, if a load 122—FIG. 2—provides cyclically recurring noise pulses. Such noise pulses may be derived, for example, from an electric motor forming a load and coupled to one of the receivers 111 and deriving its power from the power bus 114 of the ring bus 106. Periodically wobbling the pulse frequency of the clock, therefore, prevents occurrence of such periodically recurring noise pulses always at the same position with respect to sequential selection cycles. The noise pulse suppression counter 313 (FIG. 2) can eliminate pulses which do not regularly recur at the same position within the selection cycles; similarly, suitable circuits within the function synchronization signal decoder 156 can be used to suppress regularly recurring noise pulses so that only such noise pulses would have an interfering or ambiguity causing effect which always recur at the same instant of time with respect to the pulses occurring during a selection cycle, or during persistence of the control signal and which appear on the control bus 129 to affect the function of the receiver 111, and on the reply bus 149 to affect the function of the reply sensing stage 148 in the central station 110 (FIG. 1).

Regularly recurring noise pulses can, therefore, be shifted with respect to the instant of occurrence within the control signals and the selection cycles, that is, within respectively like number pulses of the control signals and the selection cycle by wobbling the frequency of clock 112. Clock 112, besides supplying clock pulses at a stable frequency or repetition rate, can additionally be connected to a R/C network 324 which is connected to its frequency determining element, and variation of the network parameters of the R/C network is then used to change the frequency of clock 112. A programming source 325 is provided which is connected to a heater element in the wobble frequency stage 324, to change the capacity of a ceramic capacitor, by heating the same, or to change the resistance of a resistor having a high temperature-resistance coefficient within the stage 324; alternatively, the stage 324 may include a capacitor, or a resistor which changes its value in dependence on optical energy applied thereto and programmed energy source 325 controls the light output of an optical coupler, for example a light emitting diode, coupled to the photo-responsive element in stage 324. Alternatively, a magnetic element may be included in circuit 324, the inductance of which is changed in dependence on the output from source 325. The program source 325 may operate cyclically or stochastically, or in dependence on external parameters. Thus, the width of the clock pulses and/or the widths of the pauses between pulses and/or the frequency of clock 112 can be changed or wobbled, thereby influencing the duration of the selection cycles and the control signals which forms the pause between selection cycles and is defined by pulses from the function synchronization generator 281.

An additional interference in the uniformity of pulse repetition rates is shown in FIG. 1; the function synchronization pulse generator 281 is connected to a function synchronization duration wobble circuit 326. Circuit 326 varies the duration of the occurrence of the control signal by changing the length of the pause between pulses from the address counter 115, as illustrated by the pulses tp in the fourth line of FIG. 3, and the corresponding pulse gap which appears in the third line of FIG. 3. The additional function synchronization duration variation stage 326 is not strictly necessary but additionally enhances the capability of the system to reject regularly recurring interference or noise pulses.

Figure 5:
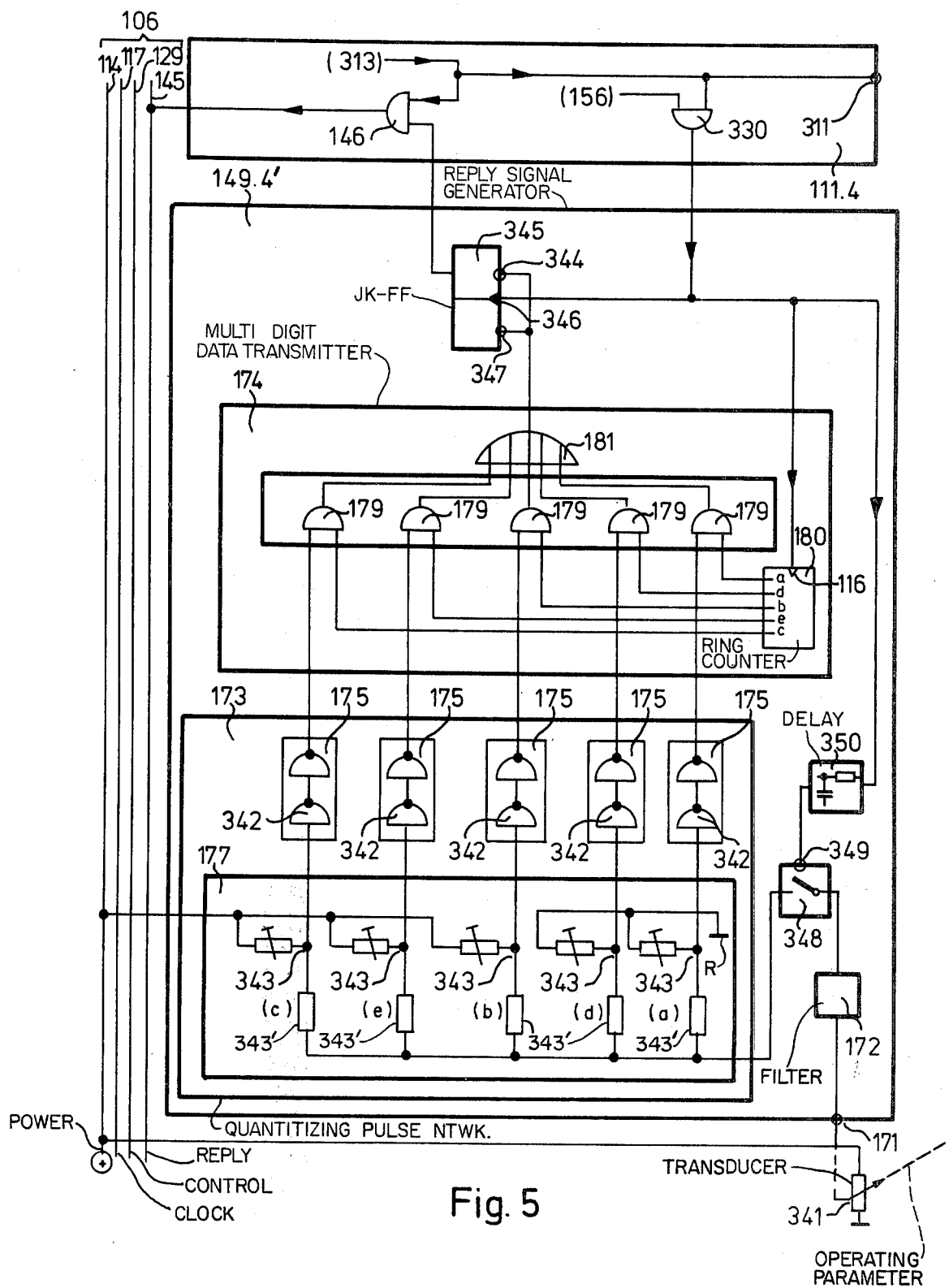
FIG. 5 is a detailed schematic diagram of the data generating stage in the receiver.

Embodiment of FIG. 5: FIG. 5 shows in detail a modified reply signal generator 149', connected to the specific load 111.4, and illustrates specifically, the generator 149.4'. Only so much of the receiver 111.4 is shown which is necessary to an understanding of the concept illustrated in FIG. 5.

The reply signal generator 149' reply information which is more detailed than that which can be transmitted in one bit. In many installations, it is desirable to transmit to the central station 110 through the ring bus system 106 to the reply sensing stage 148 information which is derived from a quantitized analog value. Thus, the reply signal generator 149 has a multi-digit data transmitter 174. The data transmitter 174 receives its data from a quantitizing pulse network 173, which converts an analog input derived, for example, from an analog source shown schematically only as a potentiometer 341 to representative values in digital output form. To eliminate short time variations, a filter 172 is connected to the transducer input 171 of the replay signal generator 149. The transducer 341 may, for example, by a potentiometer which is coupled to a float which indicates a certain fluid level within the engine of an automotive vehicle, for example, oil level, fuel level in a tank or the like. The actual transducer 341 can be any type of element which converts the desired parameter to be measured into an electrical signal which varies in dependence on variation to change in parameter need not necessarily be linear.

A reply signal generator 149' has a ring counter 180. When the count input 116 of ring counter 180 is connected to the function synchronization signal decode circuit 156—as illustrated in FIG. 5—ring counter 180 will start to count upon beginning of each new selection cycle by one step if, and so long as the specific receiver 111.4 has been selected by the central station 110—see FIGS. 1 and 2, setting of selection switch 123.4—and the noise pulse suppression counter 313 and hence the output of the receiver 311 has been activated, to thereby provide an enabling or opening signal to AND gate 330. In the specific embodiment shown, the quantitized analog value is interrogated five times, that is, is completely interrogated and sensed in five selection cycles. The number of succeeding selection cycles used to interrogate any one specific receiver will depend on the required accuracy of representation of the input value and the permissible truncating error.

The voltage appearing at the tap point, or slider of potentiometer 341 is transferred to the input terminal 171 of the quantitizing pulse network 173. As the voltage increases, a larger number of comparator output stages 175 will have an output signal appear thereat. Upon interrogation of a comparator stage 175, a reply pulse will appear on the ring bus network 106, synchronized with the clock pulse which, as described above in connection with FIGS. 1-4, is expanded in the reply data receiver 182 to a pulse having a duration approximating that of a selection cycle. A sequence of several selection cycles, therefore, will have at the information output terminal 331 of FF 332 a number of extended reply pulses which is representative of the voltage at the input 171 of the reply signal generator 149', FIG. 5. The averaging instrument 185 will then provide an indication output which corresponds to the percentage of current flow during the selected sequence of selection cycles which, if all of them provide output, would result in 100 percent output indication—in the selected example 5 sequential selection cycles. Preferably, the stages 175 are interrogated in non-sequential manner in order to insure uniform distribution of the expanded, or prolonged reply pulses throughout the number of selected selection cycles forming a complete reply cycle—five in the present example. As illustrated in FIG. 5, the stages 175 are biased COS—MOS gates 342. These gates 342 form comparators having response thresholds which correspond to a fixed fraction of the operating voltage. If this operating voltage, in this case the voltage of the supply bus 114 of the ring bus network 106 should vary, then the response thresholds of the various comparator stages 175 will vary in proportion. If the sensing transducer 341 is operated from the same supply source, the voltage variations of the supply source will have no effect on the eventual measuring output since the response threshold will have varied in the same way as the initial output of the transducer. Thus, variations of a supply voltage which may be substantial in automotive vehicles have no effect on the data being transmitted from a transducer 341 to the central station 110 and on the conseuential output therefrom.

Each one of the comparison stages 175 is formed of the series circuit of two CMOS-NAND gates. This is a preferred embodiment since these gates provide a particularly steep transfer characteristic which is essentially temperature independent. The comparator stages 175, in accordance with this embodiment of the invention require only a single supply voltage, in contrast to operational amplifiers. Otherwise, operational amplifiers would operate reliably only in the vicinity of about half the battery voltage as input. In accordance with the embodiment FIG. 5, the input through the comparison stages 175 is connected to respective tap points of a voltage divider network 177. The voltage divider network has a plurality of adjustable resistors 343 serially connected with fixed resistors 343'. The inputs of the resistor 343' are connected together and through a transfer switch 348 and the smooth filter 172 to the input 171. About half of the potentiometers 343, 343' have the other terminal connected to ground, chassis or reference potential R; about the other half is connected to the supply voltage, that is, to power bus 114. The individual voltage dividers 343, 343' have been labeled (a) . . . (e) in accordance with the output of ring counter 180.

Sequential selection cycles, upon stepping of the ring counter 180 will thus cause interrogation of the respective comparison stages 175 of the quantitizing network 173. Each time when an output signal is derived which means that the voltage at the information input 171 is sufficient to enable the comparison gates 342 in spite of the bias by the respective potentiometer 343, 343', the output of the quantitizing pulse network 173 will provide an input to the multi-digit data transmitter 174. This input signal is connected to the SET terminal 344 of a JK FF 345. The FF 345 changes state when the respective command signal on the ring bus system 106 disappears while the ring counter 180 has just stepped by one stage. The count input 116 of the ring counter 180 and the clock input 346 of the JK FF 345 are connected to the output of the AND gate 330 of the receiver 111 with which the reply signal generator 149' is associated. Let it be assumed that ring counter 180 and the respective AND gate 180 of the multi-digit data transmitter 174, the output of which is connected through the OR gate 181 to the JK FF 345 interrogates a comparator stage 175 which is not in conductive stage. In such condition, the inverting input 347 of the JK FF is controlled so that in the subsequent selection cycle no reply pulse will be transmitted to the central station 110 over the reply bus 145. Consequently, FF 332 in the central station—see FIG. 1— of the associated reply data receiver 182 is not again set after resetting by the respectively associated command or clock pulse. Information output terminal 331 thus will have a pulse gap appear thereat at least for the duration of one selection cycle, as indicated at the beginning of the last line in FIG. 3. This pulse gap will continue until, again, a comparison stage 175 (FIG. 5) is interrogated which is conductive, so that a reply pulse can be transmitted as disclosed above, which permits a new setting of FF 332 (FIG. 1).

It is desirable to so control the comparators 175 that they are not continuously enabled, or conductive, but rather, to cyclically control the comparators 175 in accordance with a clock, or stepping pulse rate synchronous with stepping of the ring counter 180 (FIG. 5), by repetitive operation of switch 348, which is also connected to the same line as the counting input 116 of ring counter 180. A delay circuit 350 connected in advance of the control terminal 349 to switch 348 insures that the comparison stages 175 are connected after the count input 116 of the ring counter 180 has commanded counting but before the clock input 346 of the JK FF 345 which causes transfer of the respective output from the SET terminal 344 or from the RESET terminal 347, as commanded, to the AND gate 346 and hence to the reply bus 145.

Switch 348 has the specific advantage that continuous control of gate 342 with a signal which varies between the binary values HIGH and LOW is avoided. Such undefined controls, with respect to binary operation, may lead to substantial overloading in the input circuits to the gates 342 due to high heat losses, and thus may cause damage and even destruction to the gates. Such overloading is reliably avoided by controlling the gates to be responsive to the respective voltage levels at voltage divider 342 only for short periods of time by interrogating the status of current flow through the respective voltage dividers, that is, by interrogating by means of the clock-controlled switch 348. The switch 348, itself, preferably is a CMOS-transmission gate or switch.

The number of comparators 175, and the number of voltage dividers 343, 343' determines the resolution of the quantity of parameter being transduced by transducer 341 and, of course, also the number of the selected cycles which must pass until a complete reply data are transmitted over the reply bus 345 of the ring bus 106. A lesser number of interrogation steps can be used by binary encoding of the quantitized information within the reply signal generator 149' and to then, correspondingly decode the reply information within the central station reply sensing stage 148. Within any one selection cycle, however, only one bit can be transmitted, however.

Rapidly varying information data applied to the input 171 of the reply signal generator 149' (FIG. 5) can be transmitted to the receiver by interrogating all the bits necessary for the transmission of the data representative of the parameter within a single selection cycle and allocating more than one address to any one receiver 111. Consequently, the address counter 115 will address the same receiver, during any one selection cycle, a plurality of times. The number of selection cycles to interrogate all the quantitizing comparators 175 and the number of address positions associated with any one of the receivers, then, must be coordinated. Thus, six bits could be interrogated in two subsequent selection cycles if any one receiver has, for example, three address numbers associated therewith.

The system preferably uses the control signal formed by a series of sequential pulses applied only to the control bus 129, as described in connection with U.S. application Ser. No. 835,180, filed Sept. 20, 1977, Weckenmann and Haubner, the pulse sequence of which is illustrated in lines 3 and 4 of FIG. 3. This system permits rapid reliable and unambiguous changeover of the function synchronization pulse generator 281, to provide the respective output pulses at terminal 284 or for connection to address counter 115. The embodiment of FIG. 6 is particularly suitable for rapid interrogation of a reply signal generator.

Figure 6:
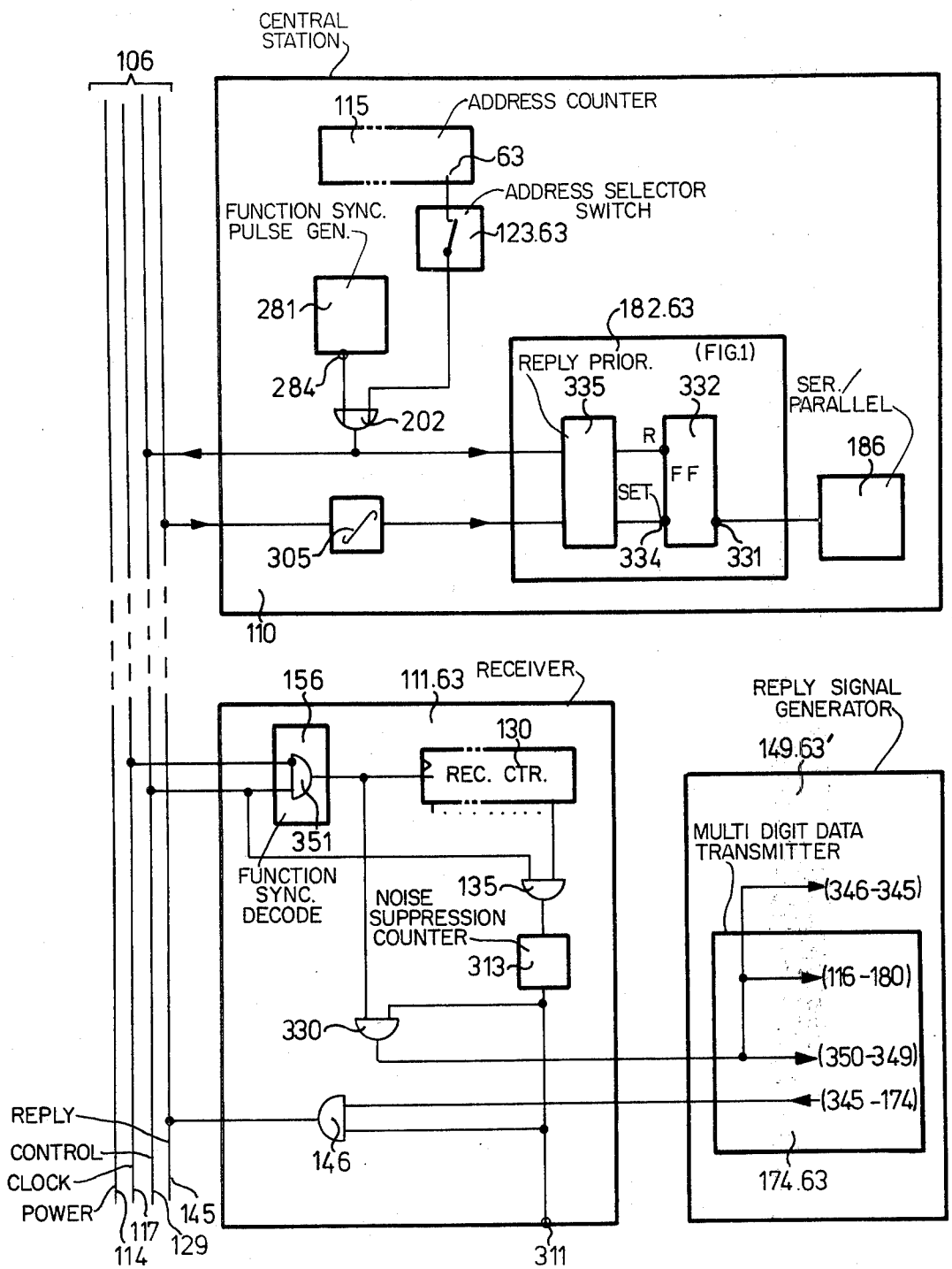
FIG. 6 shows a modified embodiment of the receiver of FIG. 5 and consequentially modified components of the central station.

Embodiment of FIG. 6: a reply signal generator 149' with a multi-digit data transmitter 174 is associated with that receiver 111.63 of the load 122.63 of a system which is located in the last available count number of the address counter 115, that is, it has the last count number within any one selection cycle associated therewith. The respective ring counter 180 is then commanded to start counting both upon occurrence of the count state of the receiver counter 130, that is, when the receiver counter 130 has counted to "63" as well as when the respective function sync pulses occur on the control bus 129. The count input 116 of the respective counter 180 thus is enabled at the count state of the receiver counter 130, as above described, through a coincidence gate 135 and preferably through a noise pulse suppression counter 313 and, additionally, upon occurrence of the respective function sync pulses on the control bus 129. The function sync decode circuit 351 includes a NAND, or inhibit gate 351 which is enabled if a pulse appears on the control bus 129 but no pulse appears on the clock bus 117—the condition during which the control occurs. Thus, the pulses to which NAND gate 351 responds are not control pulses or clock pulses, but, rather, function sync pulses. The AND gate 330 insures that only if the respective receiver 111.63 has been selected by the central station 110, the reply signal transducer 149.63' can command control of the ring counter 180, the respective JK-FF 345 and of the switch 348 as schematically shown in FIG. 6. The reply pulses which are received in the central station 110 will recur rapidly, providing data representative of interrogation of the multi-digit data transmitter 174.63. To process the rapidly recurring reply pulses, FF 332 in the receiver 110 is first reset by the associated switching pulse number 63 derived from the selection switch 123.63, and thereafter in synchronism with the function sync pulses appearing at the function sync output 284 thereof, and transmitted through OR gate 202. The SET input 334 of FF 332 is always commanded if the FF 332 is SET, that is, until occurrence of the next subsequent function synchronization pulse from the coupling gate 202, if, in the course of the rapid interrogation of the multi-digit data transmitter 174.63, rapidly recurring reply pulses are derived from the line 145.

In this embodiment, the reply pulses are not extended approximately to the length of a selection cycle, as described in connection with FIG. 1. The interrogation of multi-digit data transmitters 174.63, usually, is of particular practical interest if the data are presented in binary encoded quantitized values. To provide output which can be readily displayed, a serial-parallel converter 186 is serially connected to output 331 of FF 332 so that, upon serial-parallel conversion, the advantages of extended reply pulses would not pertain.

It is sometimes desirable to simultaneously evaluate the outputs of several transducers separately connected to the ring bus system over respective coordinate receivers 111. This embodiment is illustrated in FIG. 7.

This arrangement is particularly suitable to monitor, or supervise operating conditions occurring in an automotive vehicle which, ordinarily, are stationary and where an indication is only necessary if there is trouble.

As an example, oil pressure, operating temperature, sufficient fuel are usually present conditions in the vehicle. It is necessary to indicate disturbance or trouble only in rare occurrences, and only in such occurrences is it necessary to carry out an additional interrogation localized with respect to the disturbance unless, in some systems, it is sufficient merely to indicate that somewhere in the system, or in the engine there is trouble.

Figure 7:
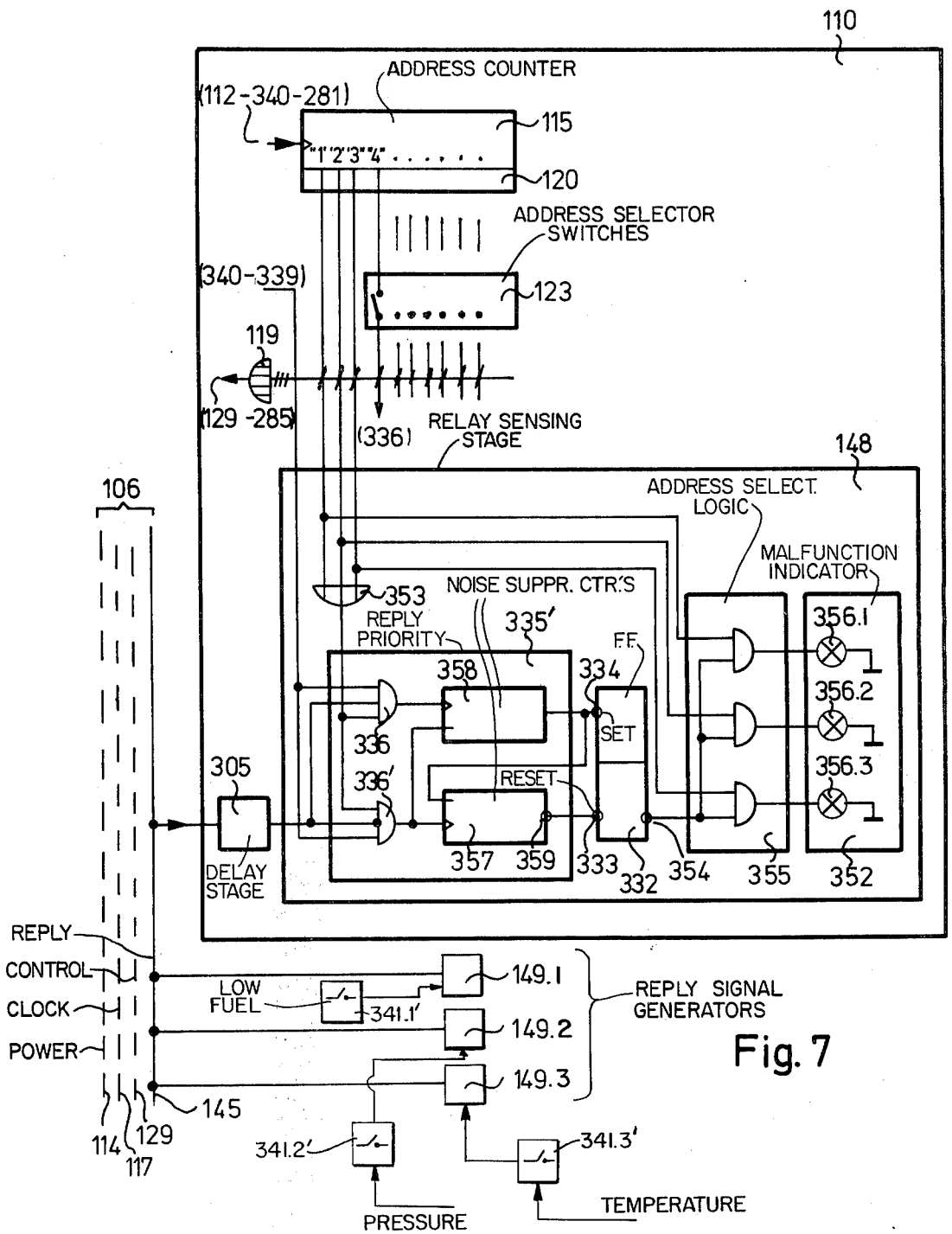
FIG. 7 is a diagram of another embodiment of the reply indicator in the central station.

The reply signal generators 149 of FIG. 7 provide one-bit binary outputs, that is, are of the ON-OFF type. They are used for monitoring or supervision of elements or operating parameters which are not manually selected by the operating switch 123 of the central station 110 but which are continuously monitored or sensed, that is, are continuously connected to provide data outputs for selection cycles commanded by the central station, which may be continuous, or in certain sequences. In the embodiment of FIG. 7, the first three count outputs of the address counter 115, that is, the count pulses associated with the first three counts, are used to address the reply signal generators 149.1, 149.2, 149.3. They are connected to their respective receivers (not shown) and provide, within the first three clock pulses respective outputs regarding normally stationary operating conditions, that is, outputs representative of commanded or normal operating state. During each selection cycle, and corresponding to the respective count number with which the respective reply signal generators 149.1, 149.2, 149.3 are associated, reply information is retransmitted over reply bus 145 to the reply sensing stage 148 in central station 110. Only if one of the reply pulses is missing, that is, if one of the transducers 341.1', 341.2', 341.3', respectively, indicates trouble, it will be necessary to provide an output signal at the central station, for example by providing an optical acoustic or other warning signal by a warning signal indicator 352 or additionally immediately activate a safety circuit.

As described in connection with FIG. 1, the SET input 334 of FF 332 is controlled over AND gate 336, 336', respectively, when a steering pulse is derived from the steering pulse output 339 of divider 340, one of the first three controlled pulses is available at the respectively associated input of the coupling OR gate 353 and, additionally, the delay integrator 305 has indicated the presence of a replay pulse on the reply bus 145. If, however, no reply pulse is present at that time, the second AND gate 336 of the priority logic 335 is enabled since, as indicated in FIG. 7, its connection to the delay stage 305 is over an inverting input. Accordingly, the reset input 333 of FF 332 becomes active and the malfunction output 354 of FF 332 will provide a signal to the connection signal indicator 352. The connection of the reply priority 335' of FIG. 7 thus differs slightly from that of the reply priority 335 of FIG. 1. The output from the malfunction terminal 354 of FF 332 does not yet provide an indication which one of the three reply signal generators has provided the malfunction signal. To permit differential addressing of the malfunction indicator 352, a decoding circuit 355 is connected in advance thereof, which has a group of AND gates, parallel connected to FF 332 and having their other respective inputs connected to address counter outputs at respective count stages 1, 2, 3. The separate conjunctive conditions thus can be satisfied both from the outputs of FF 332 at terminal 354, in common, and additionally, individually, from the respective count outputs of the output terminal group 120 of address counter 115. The malfunction indicator 352 has a plurality of indicator lamps 356.1, 356.2, 356.3 which will light, individually, in accordance with the respective malfunction.

In a preferred form, two noise pulse suppression counters 357, 358 are included in the reply priority logic 335'. The noise pulse suppression counter 357 transmits malfunction data based on non-occurrence of a reply pulse at the inverting input of the AND gate 336 to the reset terminal 333 of FF 332 only if this pulse is missing during several sequential cycles. The noise pulse suppression counter thus is responsive to a preset number of counts of pulses applied to its input, for example two, or four, or eight and transmits the output pulse only if it counts to its final state, then resetting itself. This insures that any possible transient interruption of operation, which can be sensed by sensitive reply signal generators 149 will not cause the malfunction indicators 352 to provide a malfunction signal. This is particularly important during start-up of the system and under transient conditions, that is, until the system has stabilized itself for continuous operation.

The SET input 334 of FF 332 also has a noise pulse suppression counter 358 serially connected thereto. Counter 358 insures that response of the malfunction indicators 352 will not be cancelled upon occurrence of the next subsequent pulse on the reply bus of the ring bus system 106 since this may only be an unstable, instantaneous or noise or disturbance pulse in the system. Rather, again, a sequence of proper pulses must be transmitted before the malfunction indicator 352 will cancel the malfunction indication. Otherwise, noise or stray pulses may lead to extinction of the respective indicator lamp of the malfunction indicators 352 so that investigation of the cause for the previously existing malfunction is hardly possible.

Preferably, the noise suppression counters 357, 358 mutually reset each other to their starting state. As illustrated in FIG. 7, resetting of the noise suppression counter 358 preferably occurs already in the event a single reply pulse is missing, so as to be ready in case the noise suppression counter 357 should sense the continuous absence of reply pulses for succeeding selection cycles. This is indicated by the connection from the output of AND gate 336 to the reset input of counter 358.

At least the noise suppression counter 357 may have a self-blocking circuit of its count input connected thereto. This permits elimination of the FF 332 in the reply sensing stage 148 since the count output 359 of the noise suppression counter 357 will continuously provide an output to the associated AND gate of the logic circuit 355 after it has counted to its final state and reset itself to the beginning count. The noise suppression counter 357, thus, can be provided to, inherently, furnish a reply holding output until re-triggered by new count impulses applied to the count terminal. The noise suppression counter 358 preferably has as many count positions as there are inputs to OR gate 353, that is, three in the present example. This insures that the holding circuit, formed, for example, by the noise suppression counter 357 or, as illustrated in FIG. 7 by the FF 332 can change state only if all reset pulses on line 145 and derived from reply signal generators 149.1, 149.2, 149.3 have arrived.

The system permits wide use of digital integrated circuits (IC) and specifically, the comparators 175 (FIG. 5) can readily be connected to coupled AND gates 179, fed through a buffer 181, the entire assemble being constructed either with discrete components, or with ICs. They are connected to differently biased voltage dividers 343, 343' to associate to the comparators 175 differently biased threshold levels.

The voltage dividers 343, 343' of FIG. 5 preferably are formed as a fixed resistor 343' and a variable or potentiometer resistor 343. Such connection has the advantage that they provide not only a defined switching level to the comparators 175 but, additionally, permit response to be proportionate to operating voltage so that variations in the voltage of the power bus 114, to which the transducer 341 is also connection, will have no effect on the eventual binary digital output. Thus, unstable supply networks which are known to occur in automotive vehicles will not introduce measuring errors. The use of the strobing switch 348 prevents overloading of the components of comparator 175, so that the comparators 175 are connected only for the period of time required to effect measurement, which can be held to be very short, and no longer than a clock pulse.

The holding circuit 327 in the central station preferably is connected to the priority circuit 335, although the priority circuit is not strictly necessary. The priority provides alternate setting and resetting of the holding circuit which, in the preferred form, is the flip flop 332, so that the FF will be set upon a sensing of a reply pulse by the central station, and remain set until the next subsequent clock pulse resets the FF. The FF then remains reset unless, immediately thereafter and, for example, as determined by the delay stage 305, the FF is again SET. The use of the delay stage 305 permits utilization of a simple FF circuit for the FF 332. In its simplest form, the delay stage 305 is an integrator which can be so dimensioned that it provides for the time delay while simultaneously filtering out needle, or spike disturbance pulses occurring on the reply bus 145.

Delaying the reply pulse with respect to the clock pulse by a fixed time constant, defined by the constants of the delay stage 305 introduces a constant error regarding the evaluation of the length of the output pulse of the FF 332. This constant error can be compensated by the calibration or adjustment of the indicating instrument 185 (FIG. 1). This error will no longer be constant if the cycling time of the selection cycle varies, for example if the frequency wobble program derived from stage 325 (FIG. 1) is used to control the frequency wobble of the clock 112 through stage 324 and/or the function synchronization duration is likewise wobbled by the circuit 326, which may be similar to the circuit 324, 325 combined. If wobbling of the time duration of the control signal, or of the selection cycle is used, the reply priority is preferably controlled from the clock pulse which generates clock pulses for the address counter in the central station 110 (FIG. 1) and the clock is arranged, with use of the frequency divider 340, to provide the steering, or lead pulse which has a defined delay with respect to the clock pulses, the steering pulse being additionally connected to the reply priority logic, as shown in connection with the network of FIG. 1. This steering pulse may occur between two clock pulses with a predetermined time delay, for example by the duration of a single clock pulse directly from the clock 112, if the frequency divider 340 is used. The steering pulse will then control the reply priority logic to provide its output at an instant of time in which the conditions at the input to the reply priority will be static, since these conditions will pertain between the clock pulse and the reply pulse. Any overlap of pulse flanks due to inaccurate synchronization, which may occur due to wiring delays, inductances, and capacitances in the wiring, connections, and their connecting inaccuracies, will be reliably eliminated.

The noise suppression counter 313 (FIGS. 2, 6, 7) is preferably used in connection with the networks which process data so that stray pulses introduced by disturbances will cause the noise suppression counter to count and yet provide an output signal to the holding circuit 327, and formed generally by the FF 332 (FIGS. 1, 7) only after all possible response and switching pulses, or response and switching periods with respect to the addressed load have elapsed and no response from these loads has been received.

The embodiment described in connection with FIG. 6 is preferably used in combination with the embodiment described in the aforementioned copending application Ser. No. 835,180, filed Sept. 20, 1977, Weckenmann and Haubner since the function synchronization pulses can be used as interrogation pulses for sequentially arranged comparator stages 175, 179 (FIG. 5). The simplest form of wiring such a system and physically arranging the network is to use the last count number as the number associated with the receiver from which the multi-digit data are transmitted during a single selection cycle, since the function synchronization pulses follow the selection cycle in any event.

Various changes and modifications may be may made, and features described in connection with any one of the embodiments may be used with any one of the others, within the scope of the inventive concept.

We claim:

1. Remote control system for selection of at least one of a plurality of selectively switchable loads (122) from a central station (110) comprising
   a bus system (106) connected to said central station and having a power bus (114), a clock bus (117), a load switching control bus (129), and a load reply bus (145);
   said central station (110) including a clock source (112);
   timing means (115, 281) defining a selection cycle and connecting said clock (112) to said clock bus (117) for a predetermined number of clock pulses;
   load address means (123) to select connection of the selected load (122.4) to the power bus (114);
   means (115) providing control signals synchronized with the clock pulses, coded in accordance with the load addressing means;
   a load reply sensing stage (148) connected to the reply bus (145) to decode acknowledgment reply signals received from addressed loads;
   and indicator means (185, 352) responsive to the output of the reply sensing stage;
   at least some of said loads comprising
   a load control receiver (111) having a decoding stage (130, 131, 135) connected to both said clock bus (117) and said control bus (129) to decode address command signals on the control bus appearing in synchronism with a clock pulse on the clock bus;
   reply signal generator means (149) generating a signal indicative of response by the respective addressed load to the commanded switching function;
   reply transmitting logic means (146) connected to the reply bus (145) and to the reply signal generator means (149) providing an operating function acknowledgment signal to said reply bus (145) substantially synchronously with the occurrence of said address command signal and hence the respective clock pulse on the clock bus (117), wherein, in accordance with the invention, at least one of the reply signal generator means (149) of one of said receivers (111) comprises a data generating stage (341, 341', 174);

and, in the central station, the reply decoding stage (148) comprises a data receiving stage (182) connected to the reply bus (145) and the clock bus (117) and including a holding circuit (327; 332; 357), and means (335, 337; 335', 357, 336, 336') cyclically resetting the holding circuit in accordance with the duration or time passage of sequential selection cycles.

2. System according to claim 1, wherein the reply signal generator means (149) includes (FIG. 5) a multi-digit data transmitter (174);

a quantitizing pulse network (173) providing discrete output signal in encoded binary form representative of a tranduced parameter;

and a counter (180) cyclically interrogating said quantitizing pulse network to provide, sequentially, encoded output pulses in multi-digit binary digital form representative of said transduced parameter.

3. System according to claim 2, wherein said quantitizing pulse network includes a group of voltage dividers (177; 343, 343') and comparators stages (175) connected to said voltage dividers and sensing voltage values with respect to a reference voltage appearing at said voltage dividers.

4. System according to claim 3, wherein at least some of said comparator stages (175) comprise a COS-MOS gate (342) having one input connected to a tap point on a respective voltage divider (343, 343'), one terminal of the voltage divider being connected to a transducer (341) providing an output signal representative of the transduced parameter.

5. System according to claim 4, further including a pulse-controlled switch (348) connected between the transducer (341) and the voltage divider to connect said gates for pulse-controlled periods only.

6. System according to claim 5, wherein the counter (180) cyclically interrogating the quantitizing pulse network and the pulsing of said pulse controlled switch are synchronously controlled.

7. System according to claim 6, wherein the load control receiver includes a function signal synchronization decoding stage (156) decoding pulses appearing on selected buses (117, 129) of said bus system (106) and discriminating between selection cycles and control signals separating sequential selection cycles;

the output of said function synchronization signal decoding stage (156) being connected to provide the pulses to said counter (180) and said pulse controlled switch (348).

8. System according to claim 1, wherein the load reply sensing stage (148) includes a reply data receiver (182) connected to said reply bus (145);

the reply data receiver having a reply priority logic (335; 305) and a flip-flop stage (FF) (332), the FF (332) being controlled to change state by logically applied control pulses, the FF (332) forming part of said holding circuit (327; 332).

9. System according to claim 8, further comprising delay means (305) delaying application of switching pulses applied to the FF (332) with respect to clock pulses being logically connected thereto by the reply priority stage (335).

10. System according to claim 9, wherein the delay stage (305) includes an integrator circuit (305) connected between the FF (332) and the reply bus (145).

11. System according to claim 1, wherein the clock source (112) includes a frequency divider (340) providing a steering pulse which is time delayed with respect to divided pulses derived from the frequency divider, the time delayed steering pulses being available at a steering pulse output (339);

and wherein the holding circuit (327) is controlled by the steering pulse, time-delayed with respect to the divided clock pulses controlling said timing means (115, 281).

12. System according to claim 1, wherein the timing means (115, 281) includes a counter (115) providing discrete selection pulses within a selection cycle;

and wherein the holding circuit (332) is coupled over a coupling stage (353) to a plurality of count stage outputs of said counter (115), said holding stage responding thereby to a plurality of selection signals selecting a plurality of addressed loads.

13. System according to claim 1, further including an address selection logic (355) connected to the count stages of the address counter (115) and to the holding circuit (327) to associate the output from the holding circuit with a discrete selected address upon counting of said address counter.

14. System according to claim 1, further including a noise suppression counter (311; 357, 358) connected between a bus of said bus system and a means, or stage, respectively, of said system, said counter being programmed to count to predetermined numbers representative of possible count states within the system and rejecting other numbers, thereby suppressing stray or extraneous pulses not controlled or commanded by said clock source (112).

15. System according to claim 14, wherein (FIG. 7) the holding circuit (327) includes a flip-flop (FF) (332), and a noise suppression counter (357) is connected in advance of the reset input of the FF.

16. System according to claim 14, wherein (FIG. 7) the holding circuit (327) includes a flip-flop (FF) (332), and a noise suppression counter (358) is connected in advance of the set input of the FF.

17. System according to claim 14, wherein the holding circuit includes a bistable circuit formed by two noise suppression counters (357, 358), at least one of said noise suppression counters (357) having a blocking output terminal (359) holding its count state;

means connecting the output of the other (358) of said noise suppression counters to the count control terminal of said one noise suppression counter (357) whereby said noise suppression counters will provide for the data receiving function of said holding circuit.

18. System according to claim 1, wherein (FIGS. 5 and 6) the data generating stage in the receiver includes a multi-digit data transmitter (174) having a counter (180) cyclically interrogating a quantitizing network (173) providing data outputs in discrete data bits;

the central station includes a function synchronization pulse generator (281) forming part of said timing means and providing function synchronization pulses separating pulses forming a selection cycle;

a coupling stage (202) coupling the address selector switch connecting a predetermined selected count pulse of said selection cycle to the data receiver stage (182) of the central station as well as the function synchronization pulses from the function synchronization pulse generator (281) of the central station;

and means (351) in the selected receiver decoding the function synchronization pulses and controlling the cyclic interrogation counter (180) therewith.

19. System according to claim 18, wherein the timing means in the central station includes an address counter (115) counting the pulses of the selection cycle for addressing of selected receivers;

and wherein the selected receiver responsive to both the function synchronization pulses and its address selected pulse comprises the receiver connected to the highest count output stage of said address counter.

20. System according to claim 6, further including a delay circuit (350) connected in advance of the pulse controlled switch (348) and having its output connected to the control input (349) thereof.

21. System according to claim 3, further including a bistable circuit (345) connected to the output of the multi-digit data transmitter (174), change-of-stage of said bistable circuit being controlled in synchronism with clock pulses on said clock bus (117), the respective output of said bistable circuit controlling the reply transmitting logic means (146) and hence the reply signal applied to said reply bus (145).

22. System according to claim 21, wherein said bistable circuit comprises a JK flip-flop (FF) (345), having both its set input and its reset input (344, 347) connected to said multi-digit data transmitter, one of said inputs being directly connected and the other of said input being invertedly connected.

23. System according to claim 1, further including a frequency wobble generator (324, 325) connected to said clock source (112) to wobble the clock frequency and thus permit elimination to periodically recurring stray noise pulses from interfering with response to the pulses generated by the clock source for control of said system.

24. System according to claim 1, wherein the central station includes a function synchronization signal pulse generating stage (281) forming part of said timing means and generating a control signal in the form of a plurality of function synchronization pulses, separating the selection cycles defined by said predetermined number of clock pulses;

and wherein a function synchronization wobble stage (326) is connected to said function synchronization pulse generator (281) to wobble, or vary the duration of said control signal and of the frequency of the function synchronization pulses to eliminate the effect of periodically regularly recurring stray or noise pulses from influencing the operation of said system.

25. System according to claim 1, wherein the holding circuit (327) comprises a bistable circuit (332).

26. System according to claim 25, wherein the bistable circuit (332) has a set input (334) to set said bistable circuit in one state, the set input being connected to the reply bus (145);

said bistable circuit (332) having a reset input (333), the reset input being connected to said timing means (115).

27. System according to claim 26, further including a delay stage (305) connected between the reply bus (145) and the set input (334) of the bistable circuit (332) to provide for setting of the bistable circuit immediately after resetting of the bistable circuit if a reply signal associated with the respectively addressed load appears on the reply bus (145) essentially synchronously with a selection pulse derived from said timing means and occurring synchronously with said clock pulses.

28. System according to claim 26, further including a logic circuit (335) decoding pulses from said timing means (115) and pulses appearing on said reply bus (145) and controlling setting of said bistable circuit (332) to maintain its set state for the duration of a selection cycle.

29. System according to claim 28, wherein said logic circuit is responsive to pulses from said timing means (115) to reset the bistable circuit (332) upon sensing of a selected address pulse within the selection cycle associated with the respective receiver, and immediately resetting said bistable circuit (332) if, and only if a pulse on the reply bus is sensed essentially synchronously with the occurrence of said specific selection address pulses derived from said timing means.

30. System according to claim 29, wherein the logic circuit (335) includes priority logic means and a delay means to provide for sequencing of the resetting-anewed setting of said bistable circuit (332) in proper sequence.

31. System according to claim 25, wherein the reply sensing stage (148) includes a reply pulse-reply priority logic stage (335) connected to the clock bus (117) and to the reply bus (145), and controlling the bistable circuit (332) over its reset input (333).

32. System according to claim 31, further including a delay stage (305) having integrating characteristics connected between the reply bus (145) and the reply priority logic stage (335).

33. System according to claim 32, wherein the clock source (112) includes a frequency divider (340) providing a steering pulse which is time delayed with respect to divided pulses derived from the frequency divider, the time delayed steering pulses being available at a steering pulse output (339);

and wherein the holding circuit (327) is controlled by the steering pulse, time-delayed with respect to the divided clock pulses controlling said timing means (115, 281).

34. System according to claim 3, wherein the indicator means (185) comprises an averaging-type meter.

35. System according to claim 19, wherein the indicator means (185) comprises an averaging-type meter.

36. System according to claim 13, wherein the indicator means comprises a plurality of separate indicating elements (356.1, 356.2, 356.3) selectively connected to said address selection logic (355) and separately enabled upon concurrence of an output from said holding circuit (327; 332; 357) and a respective count stage of said address counter (115) associated with any one of said indicator elements (356.1 . . .).

* * * * *